(12) United States Patent
Mallory et al.

(10) Patent No.: US 10,704,762 B2
(45) Date of Patent: Jul. 7, 2020

(54) FACETED LAMP POST LENS

(71) Applicant: CoreLED Systems, LLC, Livonia, MI (US)

(72) Inventors: Derek Mallory, Northville, MI (US); Brian Wells, Grosse Pointe Farms, MI (US); John Kahl, Troy, MI (US); Dianna Stadtherr, Novi, MI (US)

(73) Assignee: CorLed Systems, LLC, Livonia, MI (US)

( * ) Notice: Subject to any disclaimer, the term of this patent is extended or adjusted under 35 U.S.C. 154(b) by 13 days.

(21) Appl. No.: 15/702,934

(22) Filed: Sep. 13, 2017

(65) Prior Publication Data

US 2019/0078755 A1 Mar. 14, 2019

(51) Int. Cl.
| | |
|---|---|
| *F21V 3/00* | (2015.01) |
| *F21V 3/06* | (2018.01) |
| *F21V 5/04* | (2006.01) |
| *F21V 3/02* | (2006.01) |
| *B29D 11/00* | (2006.01) |
| *B29C 39/02* | (2006.01) |
| *F21Y 115/10* | (2016.01) |
| *B29K 69/00* | (2006.01) |

(52) U.S. Cl.
CPC ............ *F21V 3/0625* (2018.02); *B29C 39/02* (2013.01); *B29D 11/0074* (2013.01); *F21V 3/02* (2013.01); *F21V 5/04* (2013.01); *B29K 2069/00* (2013.01); *B29K 2995/0026* (2013.01); *F21Y 2115/10* (2016.08)

(58) Field of Classification Search
CPC . F21V 3/0625; F21V 3/02; F21V 5/04; B29D 11/0074; F21Y 2115/10; B29K 2069/00; B29K 2995/0026
See application file for complete search history.

(56) References Cited

U.S. PATENT DOCUMENTS

| | | | | |
|---|---|---|---|---|
| 6,132,345 A | * | 10/2000 | Beierschmitt | F21V 33/008 362/84 |
| 2004/0179376 A1 | * | 9/2004 | Chan | F21S 6/00 362/339 |
| 2007/0266662 A1 | * | 11/2007 | Oram | A47G 29/1216 52/311.1 |
| 2010/0226127 A1 | * | 9/2010 | Bigliatti | F21V 5/00 362/327 |
| 2011/0003655 A1 | * | 1/2011 | Chernick | A63B 39/00 473/594 |
| 2012/0224363 A1 | * | 9/2012 | Van De Ven | H01L 33/505 362/231 |
| 2013/0105853 A1 | * | 5/2013 | Kneissl | H01L 33/32 257/99 |
| 2013/0221549 A1 | * | 8/2013 | Eguro | B29C 35/0888 264/1.7 |
| 2013/0223077 A1 | * | 8/2013 | Kato | F21V 17/101 362/294 |
| 2015/0078008 A1 | * | 3/2015 | Wang He | F21V 5/045 362/311.06 |

* cited by examiner

*Primary Examiner* — Y M. Quach Lee
(74) *Attorney, Agent, or Firm* — Gunther J. Evanina; Butzel Long

(57) ABSTRACT

A decorative optical element that has an appearance of a glass optical element includes an optically transparent body having a faceted globular portion defined by a solid volume of polymeric material. A luminaire, such as for a street light, employs the decorative optical element and an LED circuit board mounted to the circuit board.

16 Claims, 4 Drawing Sheets

FACETED LAMP POST LENS

FIELD OF THE DISCLOSURE

This disclosure relates to decorative luminaires and more particularly to a polymeric optical element that produces a brilliant, sparkling effect similar to leaded glass when illuminated.

BACKGROUND OF THE DISCLOSURE

Luminaires having a light emitting globular optical element or diffuser generally comprise a hollow globular shell having a light source disposed within the shell. This is an acceptable arrangement for illumination purposes. However, for ornamental purposes where brilliance and sparkle are desired, a solid (i.e., without cavities or voids) optical element is preferred. A relatively high index of refraction that is comparable to that of glass (typically about 1.6 to 1.9) is desired. For example, leaded crystal glass (having a lead content of about 24%) has an index of refraction of about 1.9, and consequently can be used to produce brilliant, sparkling ornamental lighting. However, the high density of leaded crystal glass (about 6.6 grams per cubic centimeter) can make it unsuitable for certain applications, such as ornamental street or other outdoor lighting applications. Further, casting of larger optical elements, such as for ornamental street lighting, would involve difficult processes and expensive tools, making glass optical elements impractical for most municipal park and other street lighting applications.

SUMMARY OF THE DISCLOSURE

There is disclosed a decorative optical element for collecting, refracting and emitting light to provide a brilliant, sparkling appearance similar to a faceted leaded crystal glass. The optical element includes an optically transparent body having a faceted globular portion defined by a solid volume of polymeric material.

Also disclosed is a luminaire including at least one light emitting diode mounted on a circuit substrate, and an optical element coupled to the substrate to receive light from the at least one light emitting diode, wherein the optical element includes a faceted globular portion defined by a solid volume of polymeric material.

A process for making an elastomeric casting having radial symmetry is also disclosed. The process includes a step of providing a plurality of identical mold sections; assembling the sections to define a casting mold having a hollow volume corresponding to the shape of the desired elastomeric casting; filling the hollow volume with a curable liquid elastomeric composition; and curing the liquid elastomeric composition to form a solid elastomeric casting.

DETAILED DESCRIPTION OF THE DISCLOSED EMBODIMENTS

Figure 1:
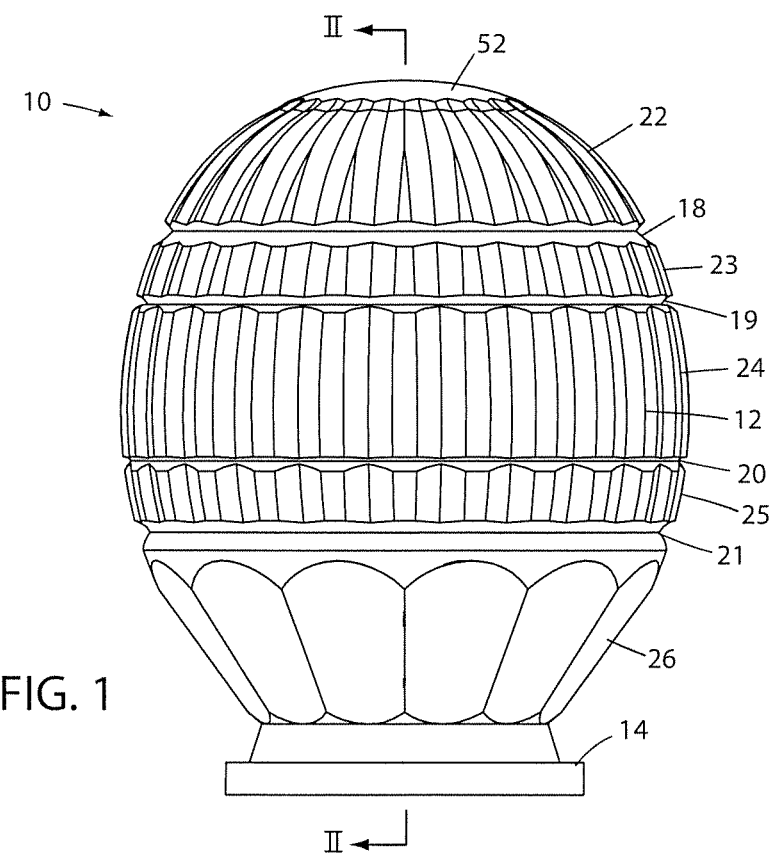
FIG. 1 is an elevational view of an optical element in accordance with this disclosure.
Figure 2:
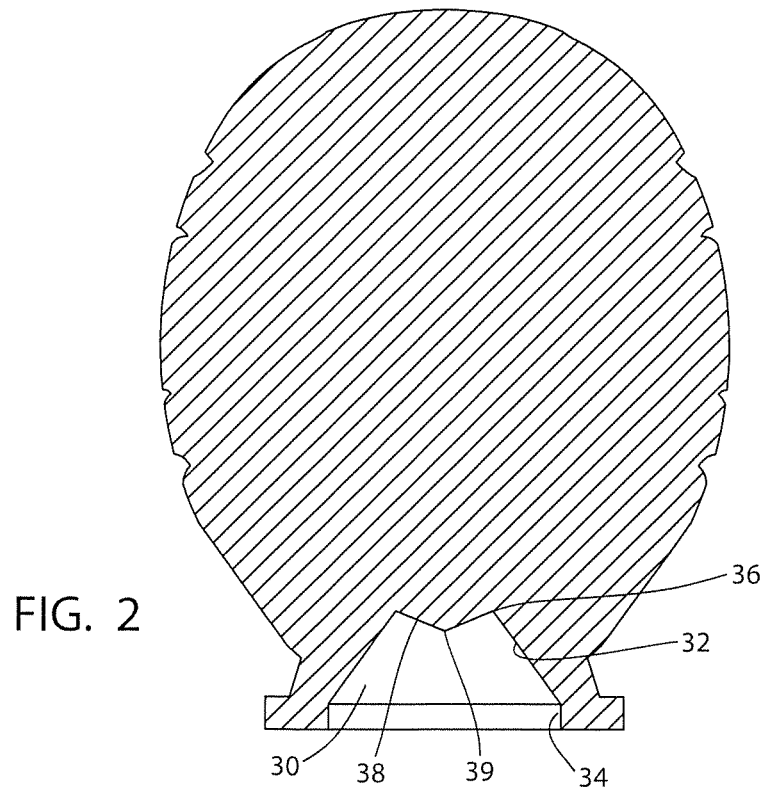
FIG. 2 is a cross-sectional view of the optical element shown in FIG. 1.
Figure 3:
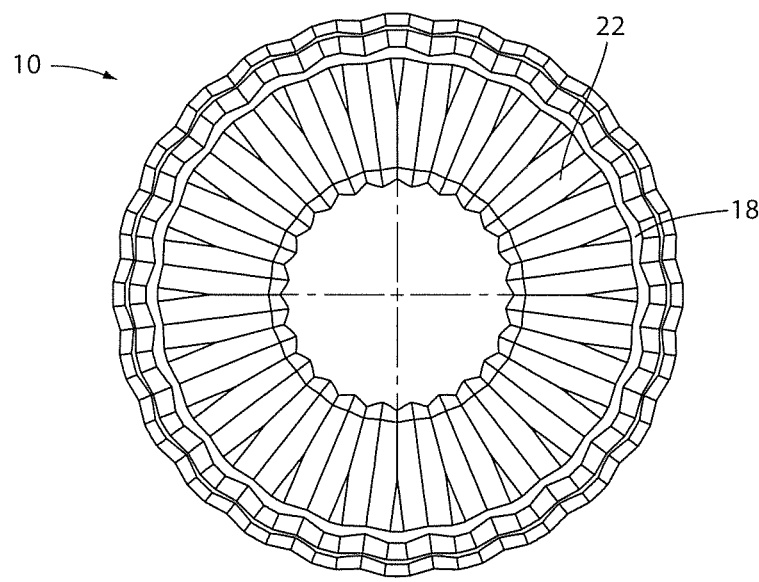
FIG. 3 is a top view of the optical element shown in FIG. 1.
Figure 4:
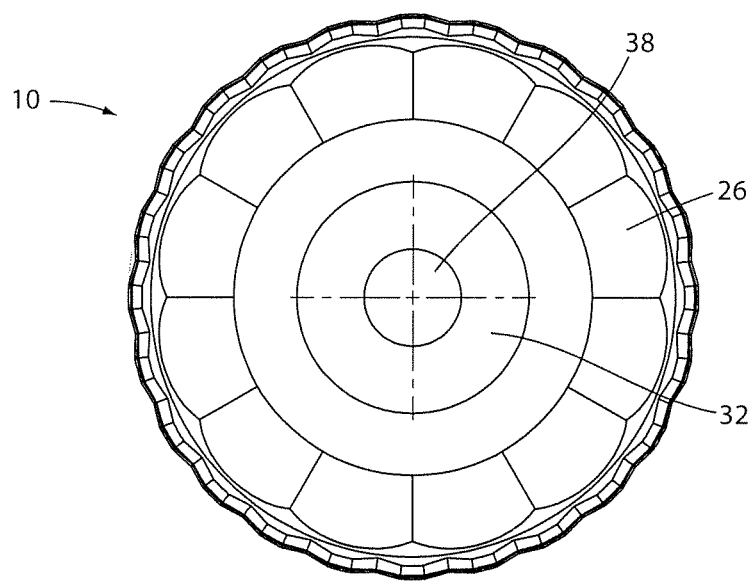
FIG. 4 is a bottom view of the optical element shown in FIG. 1.
Figure 5:
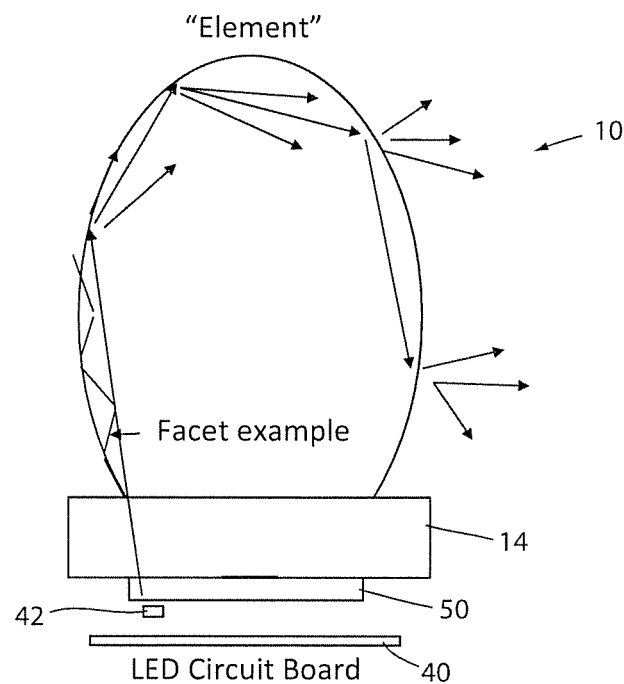
FIG. 5 is a schematic view of a luminaire employing the optical element of FIG. 1.

As used herein, the term "optically transparent" refers to a material that transmits greater than 90% of electromagnetic radiation in a visible light wavelength range (e.g., from 380 nm to 760 nm) over a distance of 3.2 mm.

The optically transparent body 10 (FIGS. 1-4) includes a faceted globular portion for collecting, refracting and emitting light, and can include other portions, especially a base portion 14 to which a circuit substrate (circuit board) to which one or more LEDs can be attached.

The term "globular" refers to portion of the optical element that is generally bulbous and continuously convex except at the base and at circumferential grooves 18, 19, 20 and 21 between faceted bands 22, 23, 24, 25 and 26.

The body 10 is a solid volume of polymeric material. The term "solid volume" means that the volume of the body is substantially free of voids or hollow spaces below the surface of the body. The solid volume of body 10 is comprised or consists of a polymeric material. Desirably, the polymeric material is made from a curable liquid resin composition. An example of a preferred liquid resin composition is a 2-part silicone resin that can be cured to form an elastomeric solid material. A suitable commercially available material is Dow Corning EI-1184 optical encapsulant, which forms a cured optically transparent silicone elastomer (polydimethyl siloxone) having an index of refraction (for light at 632.8 nm wavelength) of 1.42, and a specific gravity of about 1.04.

Other optically transparent polymeric materials can be employed. Such materials desirably have an index of refraction greater than 1.3 or greater then 1.4, and a specific gravity less than 1.2 or less than 1.1.

The base portion 14 can include a generally frustoconical recess 30 defined by side walls 34 and wall 32 that angle toward each other from the opening 34 of recess 30 to a bottom 36 of the recess. Recess 30 includes a conical protuberance 38 having a vertex 39 that is centered within the frustoconical recess 30 and located on an axis of symmetry for body 10.

The overall shape of globular portion 12 can be ellipsoidal, ovoid, spherical or other bulbous shape.

The body 10 is provided with a plurality of faceted bands 22, 23, 24, 25 and 26 circumscribing the globular portion 12. Each of the faceted bands is separated from an adjacent faceted band by a circumferential groove 18, 19, 20, 21. In certain preferred embodiments, the body 10 includes at least five faceted bands and at least four circumferential grooves.

A luminaire in accordance with this disclosure includes an optical element having body 10 as described previously, and a circuit substrate 40 on which at least one light emitting diode 42 is mounted. Substrate 40 can be joined to base 14 of body 10 using adhesives or other suitable means.

The bulbous shape and facets of globular portion 12 help scatter and spread light from LED 42 internally throughout the globular portion of body 10 and the grooves help create brilliant, sparkling points of light emission.

If desired to provide special aesthetic effects, tints and or metallic glitter flakes can be added to the curable liquid composition used to make body 10.

A collimating lens 50 can be disposed between the circuit substrate 40 and recess 30 to direct light from LEDs 42 onto walls 32 of recess 30.

The optical elements described herein can be produced using various processes, such as injection molding. However, for larger optical elements (e.g., those having an axial length from base 14 to top 52 more than a few centimeters) it is more practical to use casting techniques.

Figure 6:
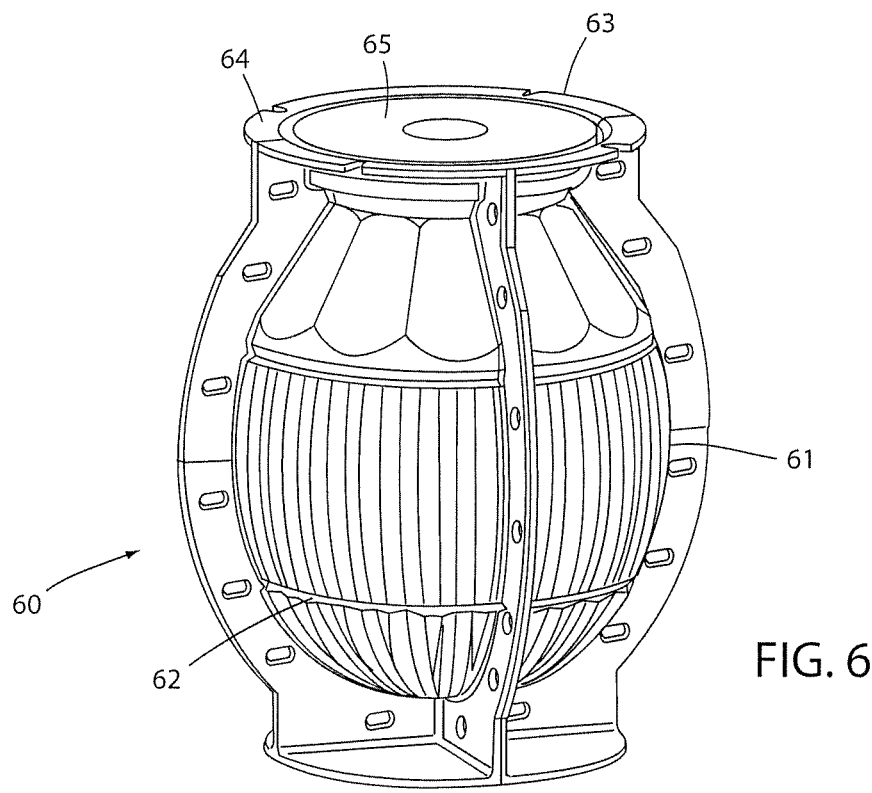
FIG. 6 is a perspective view of a casting mold that can be used to make the optical element of FIG. 1.
Figure 7:
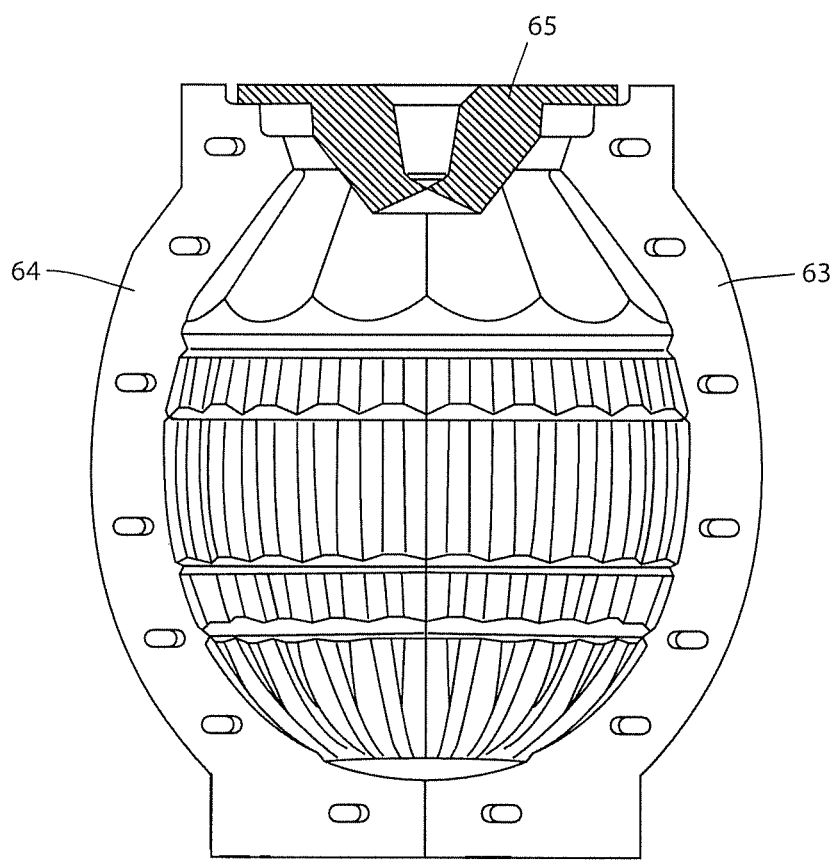
FIG. 7 is a cross-sectional of the casting mold shown in FIG. 6.

FIGS. 6 and 7 shows a casting mold 60 comprised of a plurality of identical sections 61, 62, 63 and 64 that are assembled along with a base section 65 to define a void or hollow volume that can be filled with a curable polymeric composition that is cured to form a solid cast body.

The mold sections can be very inexpensively fabricated by injection molding or by thermoforming sheet material. Preferred materials for making mold sections 61, 62, 63 and 64 are polycarbonates. The mold sections 61, 62, 63 and 64 are preferably optically and/or UV transparent to facilitate radiation curing of the body 10.

The polymeric optical elements of this disclosure are much lighter in weight than glass optical elements. For example, a polydimethylsiloxone optical element having a height of about 11 inches (from base to top) and a maximum diameter of about 9 inches weighing about 30 pounds. In contrast, a borosilicate glass of the same size would weigh about 100 pounds and a leaded crystal glass (24% lead) of the same size would weigh about 190 pounds. The reduced weight represents a substantial advantage in costs associated with production, handling, shipping and installation. It also provides a safety advantage in the event that the optical element becomes dislodged such as from a street lamp or park lamp. Other advantages include shatter resistance and inexpensive tooling and production techniques, while providing an appearance, both when lighted and when not lighted, that is the same as glass.

While the present invention is described herein with reference to illustrated embodiments, it should be understood that the invention is not limited hereto. Those having ordinary skill in the art and access to the teachings herein will recognize additional modifications and embodiments within the scope thereof. Therefore, the present invention is limited only by the claims attached herein.

What is claimed is:

1. An optical element, comprising:
   an optically transparent body having a faceted globular portion,
   wherein the globular portion is defined by a solid volume of polydimethylsiloxane elastomer, and
   wherein the globular portion includes a plurality of faceted bands circumscribing the globular portion of the body, each of the faceted bands separated by a circumferential groove.

2. The optical element of claim 1, wherein the polydimethylsiloxane elastomer has an index of refraction greater than 1.3.

3. The optical element of claim 1, wherein the polydimethylsiloxane elastomer has an index of refraction greater than 1.4.

4. The optical element of claim 1, wherein the polydimethylsiloxane elastomer has a specific gravity less than 1.2.

5. The optical element of claim 1, wherein the polydimethylsiloxane elastomer has a specific gravity less than 1.1.

6. The optical element of claim 1, wherein the body further comprises a base portion having a generally frustoconical recess.

7. The optical element of claim 1, wherein the globular portion is spherical.

8. The optical element of claim 1, wherein the globular portion is ellipsoidal.

9. The optical element of claim 6, wherein the generally frustoconical recess includes a conical protuberance having a vertex centered within the frustoconical recess.

10. An optical element, comprising:
    an optically transparent body having a faceted globular portion,
    wherein the globular portion is defined by a solid volume of polydimethylsiloxane elastomer, and wherein the optically transparent body includes at least five faceted bands and at least four circumferential grooves.

11. A luminaire comprising:
    at least one light-emitting diode mounted on a circuit substrate; and
    an optical element coupled to the circuit substrate to allow light from the at least one light emitting diode to enter the optical element and be refracted within the optical element before exiting the optical element, wherein the optical element includes an optically transparent body having a faceted globular portion defined by a solid volume comprised of a polydimethylsiloxane elastomer, and wherein the globular portion includes a plurality of faceted bands circumscribing the globular portion, each of the faceted bands separated by a circumferential groove.

12. The luminaire of claim 11, wherein the polydimethylsiloxane elastomer has an index of refraction greater than 1.3 and a specific gravity less than 1.2.

13. A process for making an optical element of polydimethylsiloxane, comprising:
    providing four identical mold sections;
    providing a base section;
    assembling the four identical mold sections and base section to define a casting mold having a hollow volume corresponding to the shape of a desired casting;
    filling the hollow volume with a curable liquid polydimethylsiloxane composition; and
    curing the liquid composition to form the casting an optical element.

14. The process of claim 13, wherein providing four identical mold sections includes thermoforming or injection molding the four mold sections.

15. The process of claim 14, wherein the mold sections are made of a polycarbonate.

16. The process of claim 15, wherein the polycarbonate resin is optically transparent.

* * * * *

UNITED STATES PATENT AND TRADEMARK OFFICE
CERTIFICATE OF CORRECTION

PATENT NO. : 10,704,762 B2
APPLICATION NO. : 15/702934
DATED : July 7, 2020
INVENTOR(S) : Derek Mallory et al.

Page 1 of 1

It is certified that error appears in the above-identified patent and that said Letters Patent is hereby corrected as shown below:

In the Claims

Column 4, Line 50 (Claim 13), "the casting" should be deleted.

Signed and Sealed this
Eighth Day of December, 2020

Andrei Iancu
*Director of the United States Patent and Trademark Office*